Nov. 7, 1939.　　　　C. DOERING　　　　2,178,780
DAIRY PRODUCT CHILLING DEVICE
Filed March 25, 1936　　　　5 Sheets-Sheet 1

Inventor
Charles Doering
BY
Attorney.

Nov. 7, 1939.   C. DOERING   2,178,780
DAIRY PRODUCT CHILLING DEVICE
Filed March 25, 1936   5 Sheets-Sheet 5

Inventor
Charles Doering
BY
Attorney.

Patented Nov. 7, 1939

2,178,780

UNITED STATES PATENT OFFICE 2,178,780

DAIRY PRODUCT CHILLING DEVICE

Charles Doering, Chicago, Ill., assignor of one-half to Henry Doering, Chicago, Ill.

Application March 25, 1936, Serial No. 70,788

9 Claims. (Cl. 257—96)

This invention relates to chilling devices and more particularly to dairy product chilling machines, although certain features thereof may be employed with equal advantage for other purposes.

It contemplates more especially the provision of improved means for hardening dairy products directly from the churn or other producing device which converts liquids into substances for eventual consumption in a solidified state.

It has heretofore been the practice of subjecting churned plastic substances to refrigeration prior to packaging or otherwise treating such for eventual consumption. This involves the placement of the newly produced dairy products into a hardening room which requires considerable time for solidifying the substances. Not only is a great deal of time entailed in hardening plastic dairy substances, but such masses become unevenly solidified in that the body proximate to the surface becomes much colder than the interior to the extent that the dairy products such as butter become mottled, non-uniform in texture, and lacking in homogeneity.

One object of the present invention is to provide means for hardening plastic dairy substances substantially instantaneously and uniformly throughout the body thereof.

Another object is to provide means for hardening successive increments of plastic dairy products so as to effect their solidification uniformly, homogeneously and substantially instantaneously.

Still another object is to provide means for instantaneously solidifying plastic dairy substances in the continuous treatment of successive increments.

A further object is to provide instrumentalities that subject successive increments of plastic dairy products to refrigeration so as to effect their solidification without entailing much time.

A still further object is the provision of means for converting plastic dairy substances into solids without entailing much time or rendering the constituents thereof lacking in complete homogeneity.

Still a further object is to provide means for uniformly treating successive increments of plastic dairy substances without entailing any appreciable time or labor and effecting their accumulation into a uniformly blended and homogeneously solidified mass.

Other objects and advantages will appear from the following description of an illustrated embodiment of the present invention.

Figure 1:
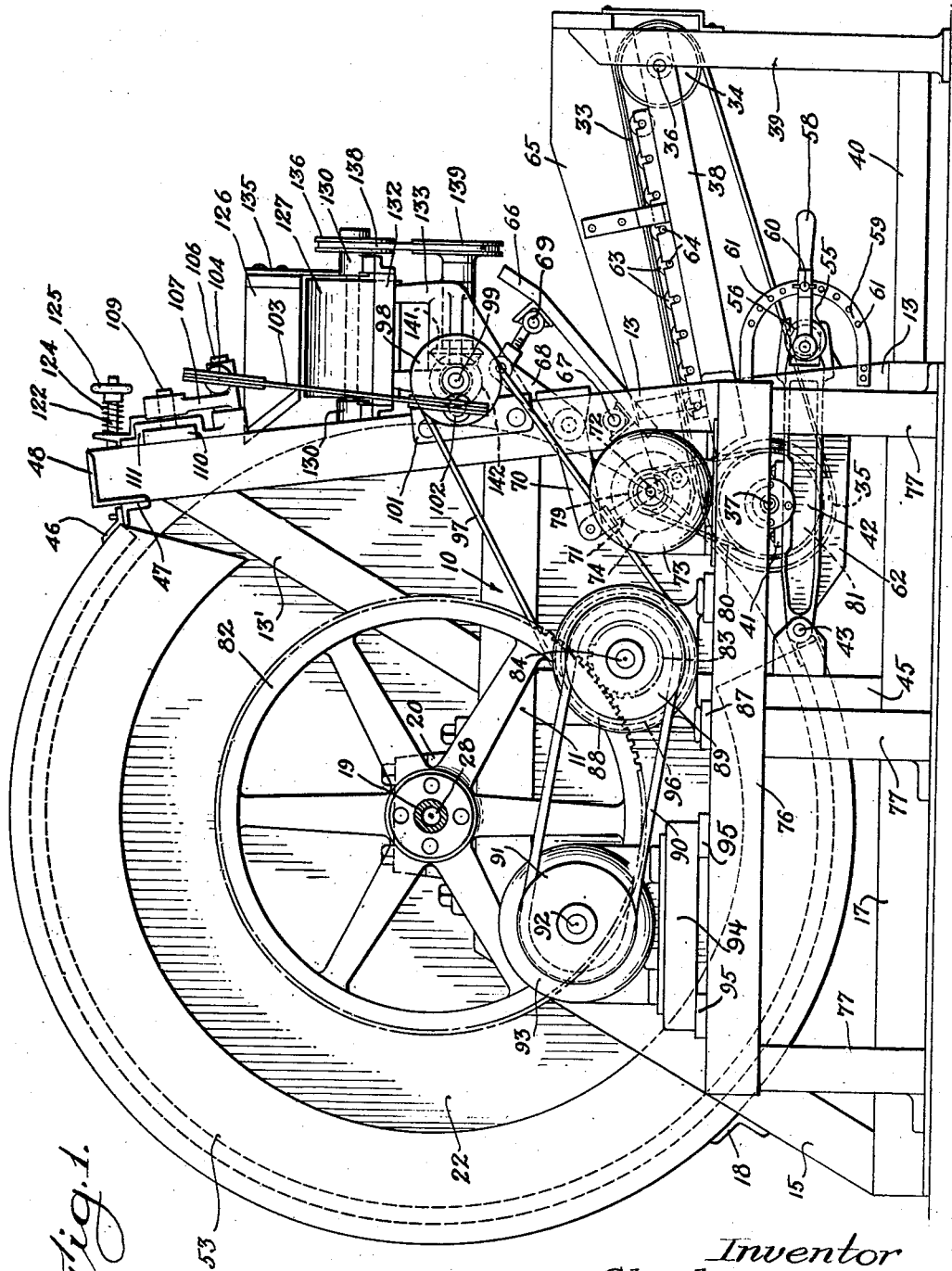
Figure 1 is a side view in elevation of a device embodying features of the present invention.

The structure selected for illustration comprises a frame 10 embodying horizontal beams 11 and 12 that are in spaced parallelism for elevated support by rearwardly inclined forward supports 13—14 and forwardly inclined rearward supports 15—16 which are interconnected and maintained in fixed spaced relation by horizontal cross-beams 17 that serve as the base of the frame 10. The horizontal elevated beams 11 and 12 as well as the inclined standards 13—14 and 15—16 are maintained in spaced parallelism by transverse cross-members 18 extending between members 15 and 16 and fastened thereto. Forwardly inclined intermediate beams 13'—14' are interposed between the beams 11—12 and 13—14 so as to rigidify the framework and supporting structure as will appear more fully hereinafter.

A shaft 19 is supported by the horizontal beam members 11 and 12 which are provided with split bearings 20 and 21, respectively, for journalled support of the shaft 19. The shaft 19 carries a comparatively large cylindrical member such as a drum 22 that is fixed to the shaft 19 for rotation therewith between the horizontal beam members 11 and 12. The drum 22 presents a large circumferential surface that is refrigerated in any suitable manner as commercial practice may dictate. In this instance the drum 22 is refrigerated by providing a comparatively narrow chamber 23 interiorly thereof owing to the provision of a somewhat smaller drum 24 concentrically positioned therein for rotation therewith owing to its attachment to the shaft 19.

It is to be noted that the refrigerant chamber or space 23 extends around to the sides 25 of the external drum 22 in that the internal drum 24 is uniformly smaller and of corresponding shape to present a refrigerating chamber 23 throughout the surface extent thereof for communication with apertures 26 and 27 provided in the shaft 19 that is tubular to present the axial passages 28 and 29 proximate to both ends of the shaft 19. It will be apparent, therefore, that any suitable refrigerant such as a brine solution may be circulated through the axial passage 28 for discharge through the aperture 26 and circulate through the refrigerant space 23 for eventual discharge through the aperture 27 and the axial passage 29. For that matter, the direction of supply or circulation may be reversed, it only being important to bring the refrigerant in contact with the peripheral surface of the external drum 22 to maintain such at freezing temperature for chilling plastic substances in a manner that will appear more fully hereinafter.

It will be apparent that the shaft 19 has threaded couplers 30 and 31 fixed to the extremities thereof to enable the connection of the refrigerating supply thereto as well as its recirculation in a manner that is known in the art. The sides 25 of the external drum 22 are provided with sheets 32 of insulation material so that the heat-absorbing action of the refrigerant will be confined to the peripheral surface of the drum 22 along which the plastic substances traverse for contact therewith to more effectively and instantaneously impart a chilling temperature thereto and effect the solidification thereof in successive increments as the drum 22 rotates with the conveyor mechanism for feeding the dairy substances thereto in a continuity of operations.

The dairy or other substances are supplied to the peripheral surface of the external drum 22 by an endless conveyor belt 33 which runs over rollers 34 and 35 fixed to shafts 36 and 37, respectively. The shaft 36 is journalled in a conveyor frame unit 38 which is supported by a standard 39 and the forward frame standards 13 and 14. The vertical standard 39 may be reinforced by a cross-member 40 that effects the attachment thereof to the base 17 of the frame 10. The shaft 37, on the other hand, is journalled in the bearings 41 carried by an elongated bracket 42 which is pivoted as at 43 to a cylindrical housing or casing 44 which envelops the external drum 22 for spaced concentric positioning relative therewith. The cylindrical casing 44 is supported by the standards 13—14 and 15—16 as well as a strut 45 fixed to the base 17. The cross-member 18 which bridges the rearward inclined standards 15 and 16 may also be resorted to for bracing and supporting the housing 44.

It is to be noted that the shaft 37 which drives the roller 35 of the feeding conveyor 33, is or may be of tubular construction (see Figure 4) so as to enable the circulation of the refrigerant through the interior of the drive roller 35 and provide a chamber that is conducive to the discharge of the plastic substance to the drum 22. Threaded pipe couples 37' (Figure 3) are fixed to the extremities of the shaft 37 to enable the introduction of any suitable refrigerant into the conveyor roller 35 for the specified purpose.

The top extremity of the casing 44 is fixed to a plate 46 attached to an angle bar 47 bolted or otherwise anchored to an angle plate 48 that extends between and is countersunk into the top extremities of the forward inclined standards 13—14. As shown, the casing 44 comprises spaced metallic sheets 49 and 50 spaced with insulation material 51 to preclude or minimize thermal transmission therethrough and to confine the freezing medium within the space 52 defined between the external drum 22 and the interior surface 49 of the drum casing or housing 44. Side members 53 extend from the casing 44 to project beyond the sides of the drum 22 so as to confine the material traversing space 52 and preclude the entrance of foreign substances that are usually prevalent in the atmosphere.

In order to vary the position of the conveyor roller 35 on the conveyor belt 33, the forward extremity 54 of the elongated bracket 42 is furcated as at 55 to receive an eccentric 56 mounted on a shaft 57 that has a handle member 58 fixed thereto to adjust the angular position of the bracket 42 relative to its pivot 43. An arcuate bracket 59 is fixed to the forward inclined standard 13 in the path of the handle member 58 which has a threaded stud 60 projecting therethrough to engage any one of the apertures 61 provided in the arcuate bracket 59 to maintain the handle member 58 in a predetermined adjusted position.

A collector and conveyor belt cleaning pan 62 is carried by the pivot shafts 43 and 57 of the elongated conveyor roller bracket 42 so that the conveyor belt 33 will have traverse therein on its return to discharge the residue of the substances that pass therethrough and do not enter the chilling path 52 defined by the external drum 22 and the confronting surface 49 of the housing 44.

Any suitable scraper may be provided for contact with a conveyor belt 33 to remove such residue that remains thereon while in the confines of the collector pan 62. A series of transverse rollers 63 having axially extending rods 64 are journalled for support by the conveyor roller supporting frame unit 38 to enable a supply of large quantities of dairy plastics from any suitable source such as a churn to the refrigerated drum 22. Upstanding members 65 are fixed to the conveyor roller frame unit 48 and its forward standard 39 to define a substantially rectangular guide trough for substances that are carried by the conveyor belt 33 for contact with the peripheral surface of the external drum 22 that carries the substances through the chilling space 52.

Figure 2:
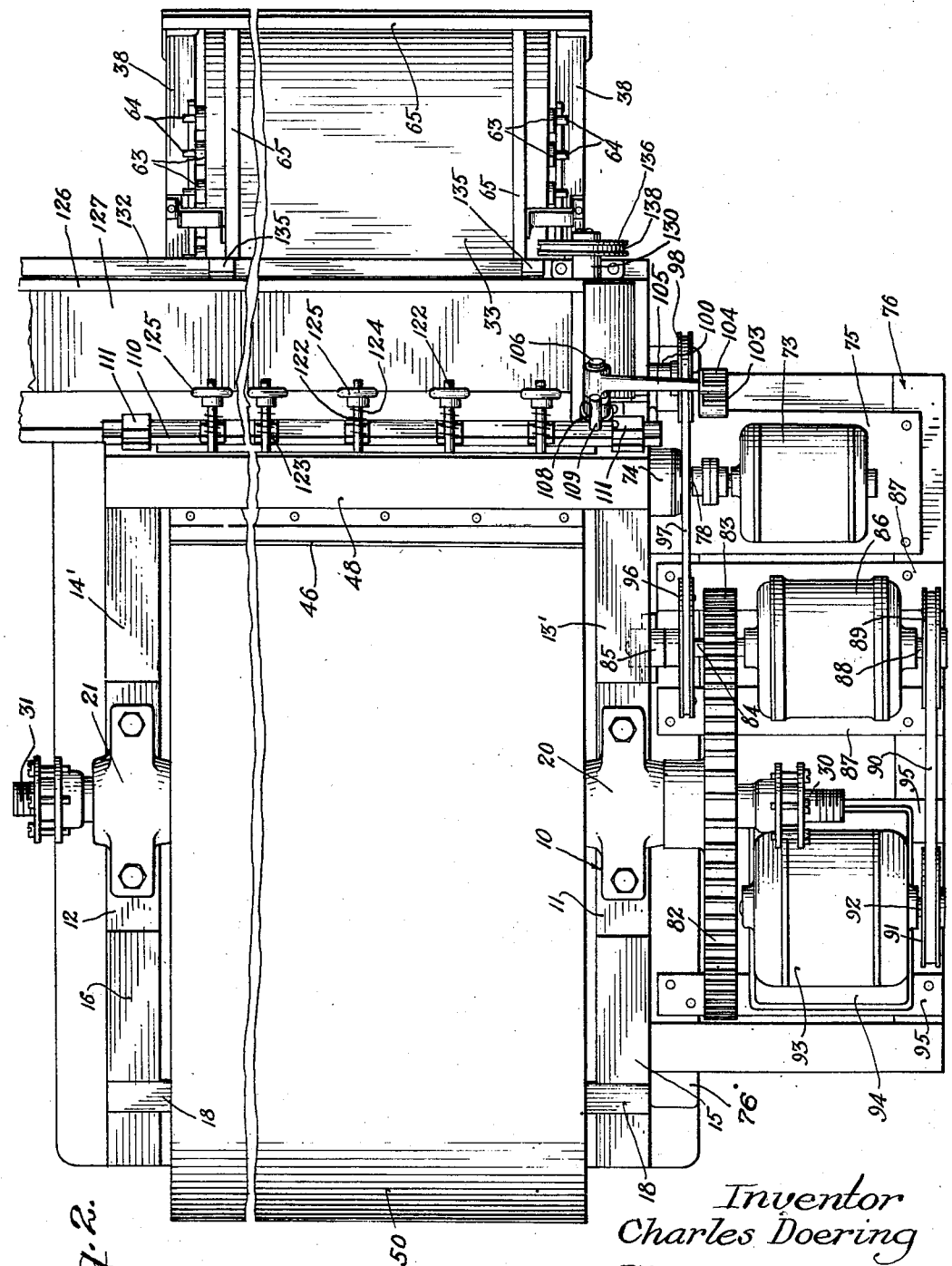
Figure 2 is a plan view of the device shown in Figure 1.
Figure 3:
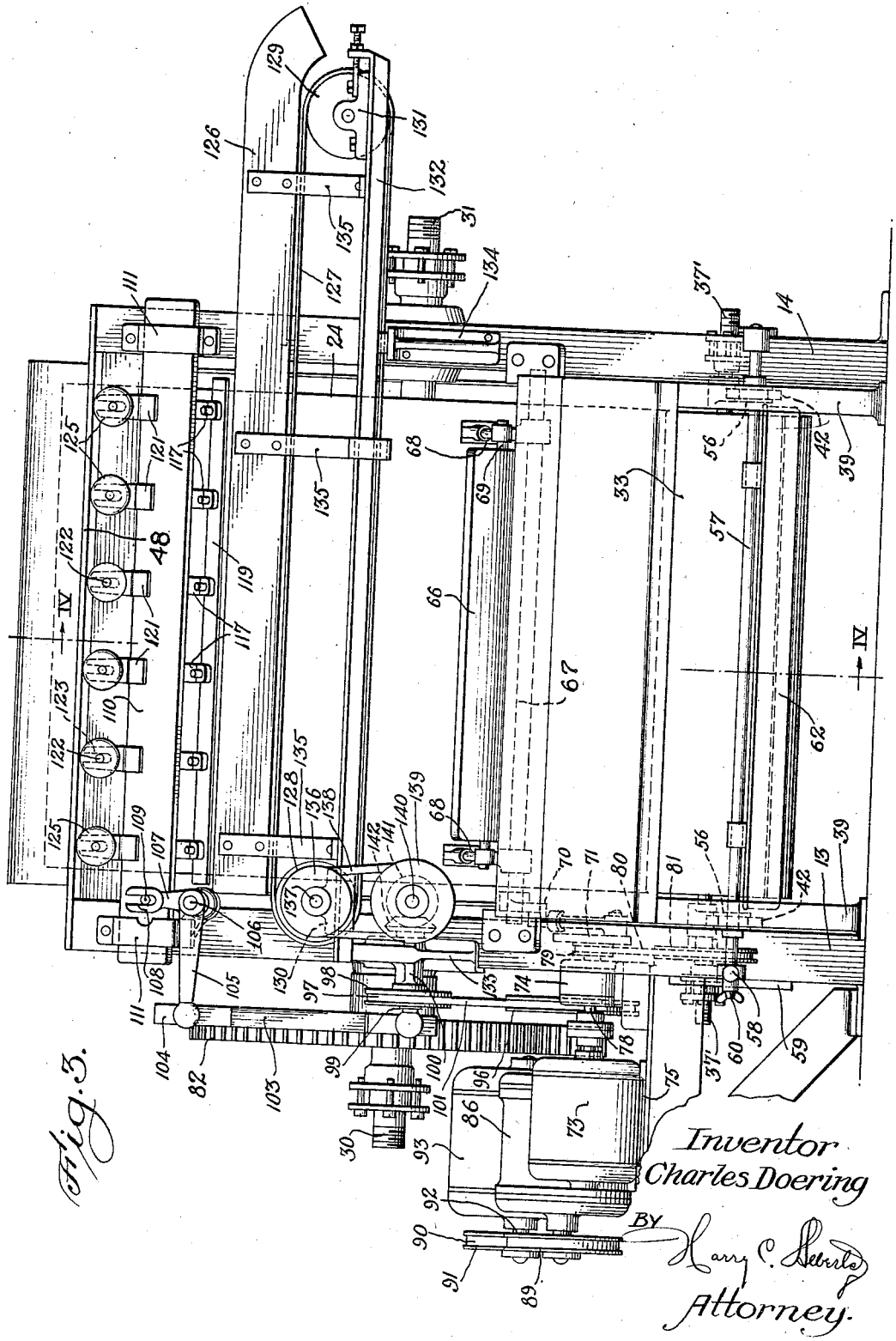
Figure 3 is a front view in elevation of the device shown in Figure 1.
Figure 4:
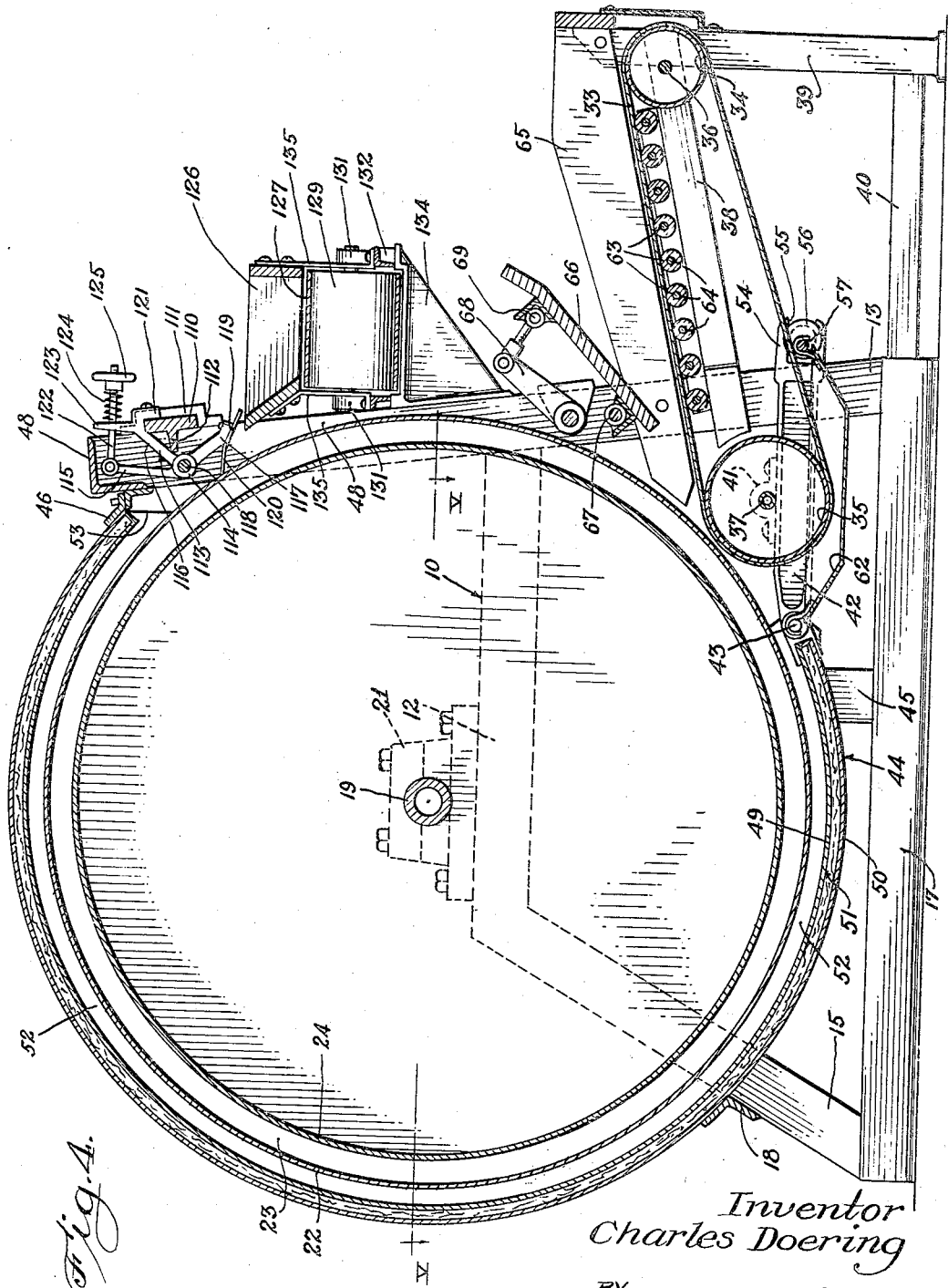
Figure 4 is a sectional view in elevation taken substantially along line IV—IV of Figure 3.
Figure 5:
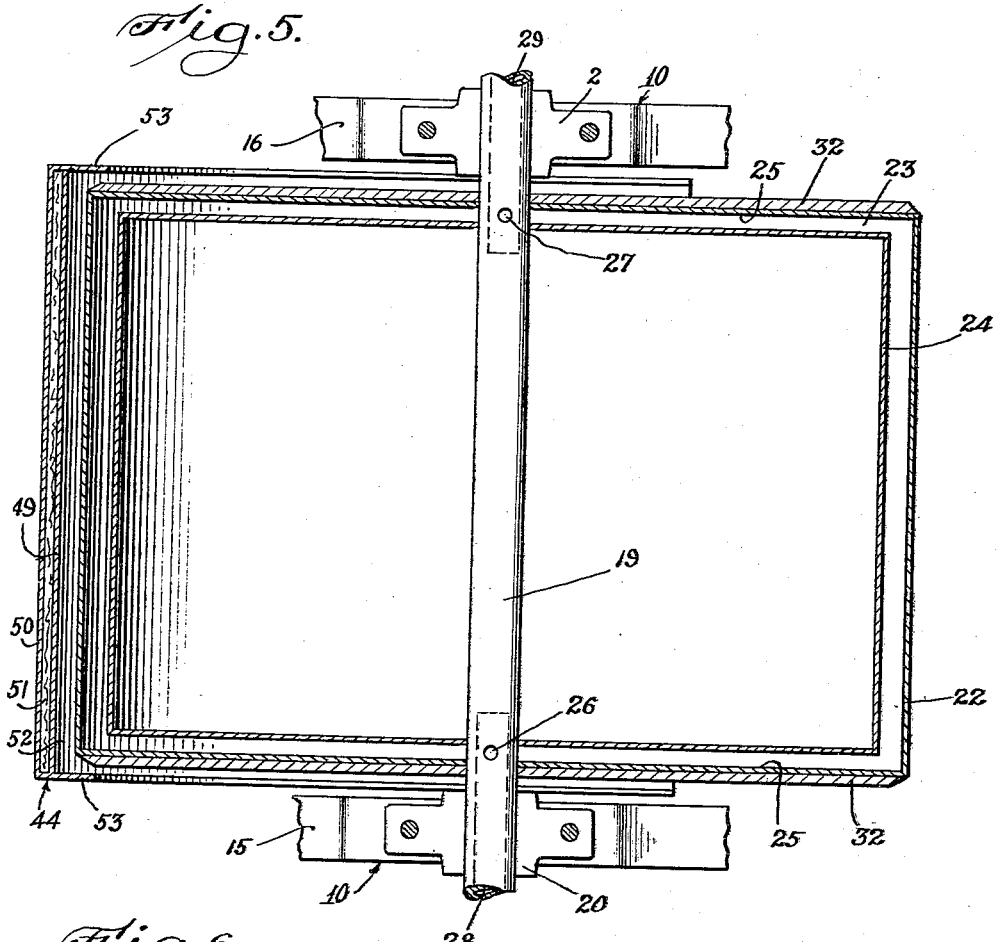
Figure 5 is a sectional view taken substantially along line V—V of Figure 4.

In order that the substances may be deformed prior to their delivery to the drum 22 in contact with the peripheral surface thereof and provide for the entry thereof into the chilling space 52 for instantaneous solidification, a flat rectangular compressing member 66 is pivoted between the forward frame supporting standards 13—14 as at 67 for oscillation by interconnected lever arms 68 which have a shaft 69 extending therebetween for attachment through brackets to the forward and upward portion of the compressing member 66 (Figures 3 and 4). The oscillating arm 68 is connected with a lever 70 that has its extremity linked to a bell crank 71 which is fixed to a shaft 72 rotated by an electric motor 73 through a train of reducing gears confined in the casing 74 (Figures 1 and 2).

The electric motor 73 is mounted on a plate 75 which is fixed to a horizontal beam 76 supported at the proper elevation by standards 77 to comprise a laterally positioned auxiliary frame attached to the primary framework 10 described above. It is to be noted that the shaft 78 which is interposed between the electric motor 73 and speed reducer 74, carries a pulley 79 over which a belt 80 passes for connection with the pulley 81 fixed to the shaft 37 that carries the conveyor roller 35 (Figures 1 and 4) so as to oscillate the substance deforming member 66 and simultaneously rotate the drive roller 35 of the conveyor 33 to feed plastic substances from a churn or other source to the surface of drum 22.

The moment the substances contact the peripheral surface of the external drum 22, traverse of successive increments is effected thereto and along the chilling chamber 52 so that freezing is instantaneously effected to cause the solidification of the plastic substances. Rotation of the drum 22 is effected by means of a large spur gear 82 fixed to the shaft 19 beyond the bearing 20 for meshing engagement with a pinion 83 carried by a shaft 84. The shaft 84 is journalled in a bearing 85 supported by the frame 10, the shaft 84 extending from a speed reducer 86 mounted on plates 87 carried by the beams 76 of the auxiliary frame described above. The shaft 84 is operatively connected to a train of gears within the speed reducer 86 for response to the rotation of the shaft 88 which extends from the other end thereof to carry a pulley 89 over which a belt 90 extends for engagement with a pulley 91 fixed to an armature shaft 92 of the electric motor 93.

The electric motor 93 has its base on a platform 94 supported by cross-beams 95 that bridge the parallel beams 76 of the auxiliary frame, the motor imparting comparatively slow rotation to the drum 22 owing to the speed reducer 86 and the comparative diameters of the spur gear 82 relative to its driving pinion 83. It is to be noted that the shaft 84 that extends from the speed reducer 86 carries a pulley 96 adjacent the pinion 83 for peripheral engagement by a belt 97 which engages a pulley 98 carried by the shaft 99 journalled in a bearing 100. The bearing 100 is carried by a bracket 101 fixed to the extensions 48 of the forward inclined standard or support 13.

As shown, the pulley 98 is rotated by the shaft 84 through the medium of a belt 97 so as to impart rotary movement to the crank arm 102 pivoted thereon for operative connection with a bar 103. The bar 103 is attached, at its other extremity, to a crank arm 104. The crank arm 104 is in swivel engagement with a lever 105 (Figure 3) which is pivoted on a stud 106 carried by the forward frame standard extension 48 to impart oscillatory movement to an arm 107 formed integral with the lever 105. The arm 107 has an integral furcated end 108 to receive a pin 109 that is anchored in a plate 110 guided for reciprocation in brackets 111 fixed to the extensions 48 of the forward inclined standards 13—14.

The plate 110 has a longitudinal rib 112 that extends from the backward surface thereof in the direction of a plurality of brackets 113 having bosses 114 connecting the radial arms 115, 116 and 117 thereof, in this instance three, which are journalled to a transverse shaft 118 that is freely suspended between the extensions 48 of the forward frame standards 13—14. Any number of brackets 113 may be provided along the shaft 114, there being five in this instance for supporting a blade scraper 119 that is attached to the lowermost arm 117 of the brackets 113. The scraper 119 has its edge 120 in engagement with the external surface of the drum 22 to remove the chilled substances therefrom as will appear more fully hereinafter.

It will be noted that the scraper blade 119 reciprocates with the supporting plate 110 that has the brackets 113 attached thereto in that the radial arms 116 thereof are provided with depending flanges 121 that extend over the top of the supporting plate 110 for support of the brackets 113 with their aligning shaft 118. Adjustment of the scraper blade 119 with its edge 120 relative to the exterior surface of the drum 22, is made possible through the rod 122 which is pinned at the end of bracket arm 115 and is guided by the forked projections 123 extending upwardly from the bracket arms 116. A compressing spring 124 envelops the rod 112 beyond the furcated projection 123 to normally urge the scraper blade 119 in contact with the drum 22 through the controlled compressing of the spring 124 by knobs 125 in threaded engagement with the extremities of the rods 122.

It will be apparent, therefore, that the scraper blade 119 with its operating edge 120 is resiliently suspended for normal rotary urging about the shaft 118 in a clockwise direction (viewed from Figure 4) toward the surface of the drum 22 where adjustment thereof is afforded through the manipulation of the knobs 125. Reciprocation of the scraper blade 119 by the instrumentalities described supra, enables uniform wear both on the drum and the edge 120 of the scraper blade 119.

The chilled substances are removed by the scraper 119 from the surface of the external drum 22 for discharge to a conveyor trough 126 which is disposed beneath the scraper blade 119 for deposition of the chilled substances upon an endless conveyor belt 127. The endless conveyor belt 127 engages the periphery of horizontally spaced rollers 128 and 129 that are journalled in bearing brackets 130 and 131 fixed to elongated frame members 132 supported by angle brackets 133 and 134 attached to the forward inclined frame standards 13—14 (Figure 3). The trough 126 is supported above the top surface of the moving conveyor belt 127 by means of brackets 135 that are attached to the elongated frame members 132 horizontally disposed in a transverse direction to constitute a conveyor frame that discharges the chilled substances in consequence of clockwise rotation of the conveyor rollers 128 and 129 (viewed from Figure 3).

Figure 6:
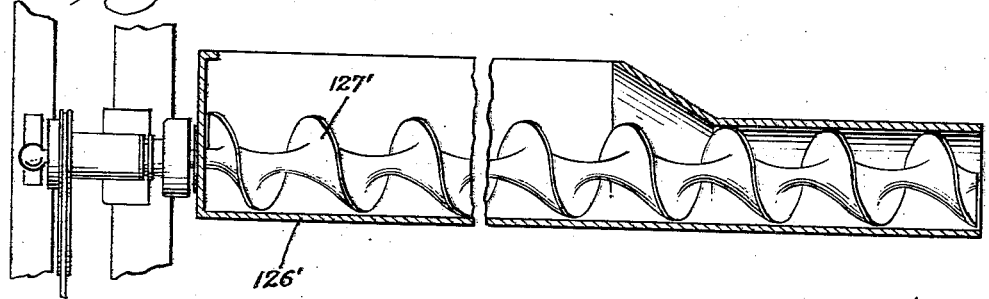
Figure 6 is a sectional view in elevation of a modified form of discharge conveyor that may be utilized or substituted for the conveyor shown in Figure 4.

Clockwise rotation of the drive conveyor roller 128 is effected through a pulley 136 carried by the conveyor roller shaft 137. The pulley 136 has a belt 138 provided over the grooved periphery thereof for peripheral engagement with a pulley 139 fixed to a shaft 140. The shaft 140 (Figure 3) has a bevel gear 141 thereon for meshing engagement with a correspondingly sized bevel gear 142 carried by the extremity of the shaft 99 that is journalled in the bearing 100 described above. It is to be noted that for the belt conveyor 127 may be substituted a screw conveyor 127' (Figure 6) that is confined in a housing 126' (Figure 6) to discharge the chilled substances into a butter print machine or other dairy treating device as commercial practice may dictate. For that matter, the chilled substances may be directed by the conveyor 127 or 127' to a machine for filling tubs or other containers with the dairy products that have been chilled in the manner and with the apparatus described supra. The screw conveyor 127' is advantageous from the standpoint that it serves to knead or work the solidified substances to impart the desired texture and body thereto preparatory to discharge into a suitable device for further treatment or handling.

It should be appreciated that the instantaneous chilling of plastic substances as they come from the churn or other treating machine, renders such available for immediate packaging and confinement in containers that precludes the access of air thereto. This is conducive to a much fresher product that is available for the market immediately upon being produced. As a result, the edible products are much better in taste, more uniform, and exceedingly more sanitary. Products that are packaged immediately after their production, have an improved taste and texture over products which are stored or subjected to hardening over an appreciably longer period of time.

It is important to package edible substances as soon after their production as possible and the teachings of the present invention enables instantaneous packaging upon being removed from the churn or other treating device. Containers in use in modern industry are hermetically sealed so as to preclude access of the atmosphere. This is highly desirable and greatly improves the product from every possible standpoint when so packaged immediately after their production and/or chilling.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device of the character described, the combination with conveyor means for feeding plastic material along a predetermined path, of means confronting said conveyor means for deforming the plastic material into flattened masses, means providing an enlarged moving refrigerated surface in said path for traverse of the plastic material thereover to effect its conversion to a solid state, moving scraper means for removing the said material from said refrigerated surface, and means for conveying the solid material along a predetermined path for further treatment or packaging.

2. In a device of the character described, the combination with conveyor means for feeding plastic material along a predetermined path, of means confronting said conveyor means for deforming the plastic material into flattened masses, means providing an enlarged moving refrigerated cylindrical surface in said path for traverse of the plastic material thereover to effect its conversion to a solid state, reciprocatory scraper means for removing the said material from said refrigerated surface, and means for conveying the solid material along a predetermined path for further treatment or packaging.

3. In a device of the character described, the combination with conveyor means for feeding plastic material along a predetermined path, of means confronting said conveyor means for deforming the plastic material into flattened masses, means providing an enlarged rotatable refrigerated cylindrical surface in said path for traverse of the plastic material thereover to effect its conversion to a solid state, reciprocatory scraper means for removing the said material from said refrigerated surface, and means for conveying the solid material along a predetermined path for further treatment or packaging.

4. In a device of the character described, the combination with conveyor means for feeding plastic material along a predetermined path, of oscillating means confronting said conveyor means for deforming the plastic material into flattened masses, means providing an enlarged rotatable refrigerated cylindrical surface in said path for traverse of the plastic material thereover to effect its conversion to a solid state, reciprocatory scraper means for removing the said material from said refrigerated surface, and means for conveying the solid material along a predetermined path for further treatment or packaging.

5. In a device of the character described, the combination with a frame, of a cylindrical member journalled for rotation on said frame, means for refrigerating the surface of said cylindrical member, means for feeding plastic material to the surface of said cylindrical member, means confronting said feeding means for compressing the material into and discharging slab-like formations to said refrigerated cylindrical member, means providing an extended surface shaped to conform with the configuration of said cylindrical member and externally spaced therefrom to define a refrigerated path for the material from said feeding means, and reciprocatory scraper means for removing the refrigerated material from said cylindrical surface.

6. In a device of the character described, the combination with a frame, of a cylindrical member journalled for rotation on said frame, means for refrigerating the surface of said cylindrical member, means for feeding plastic material to the surface of said cylindrical member, oscillating means confronting said feeding means for compressing the material into and discharging slab-like formations to said refrigerated cylindrical member, means providing an extended surface shaped to conform with the configuration of said cylindrical member and externally spaced therefrom to define a refrigerated path for the material from said feeding means, and reciprocatory scraper means for removing the refrigerated material from said cylindrical surface.

7. In a device of the character described, the combination with a frame, of a cylindrical member journalled for rotation on said frame, means for refrigerating the surface of said cylindrical member, means for feeding plastic material to the surface of said cylindrical member, oscillating means confronting said feeding means for compressing the material into and discharging slab-like formations to said refrigerated cylindrical member, means providing an extended surface shaped to conform with the configuration of said cylindrical member and externally spaced therefrom to define a refrigerated path for the material from said feeding means, reciprocatory scraper means for removing the refrigerated material from said cylindrical surface, and means for conveying the refrigerated material from said scraper means for further treatment or packaging.

8. In a device of the character described, the combination with a frame, of a cylindrical member journalled for rotation on said frame, means for refrigerating the surface of said cylindrical member, means for feeding plastic material to the surface of said cylindrical member, means providing an extended surface shaped to conform with the configuration of said cylindrical member and externally spaced therefrom to define a refrigerated path for the material from said feeding means, means for varying the space between said cylindrical member and said last named surface, and means for removing the refrigerated material from said cylindrical surface.

9. In a device of the character described, the combination with a frame, of a cylindrical member journalled for rotation on said frame, means for refrigerating the surface of said cylindrical member, means for feeding plastic material to the surface of said cylindrical member, means confronting said feeding means for compressing the material into and discharging slab-like formations to said refrigerated cylindrical member, an extended surface shaped to conform with the configuration of said cylindrical member and externally spaced therefrom to define a refrigerated path for the material from said feeding means, means for adjusting said last named surface relative to said cylindrical member, and means for removing the refrigerated material from said cylindrical surface.

CHARLES DOERING.